US012791677B2

(12) United States Patent
Howard et al.

(10) Patent No.: US 12,791,677 B2
(45) Date of Patent: Nov. 10, 2026

(54) TECHNIQUES FOR PROVIDING A VARIETY OF LIDAR SCAN PATTERNS

(71) Applicant: AEVA, INC., Mountain View, CA (US)

(72) Inventors: Cameron Howard, Bend, OR (US); Sawyer Isaac Cohen, Menlo Park, CA (US)

(73) Assignee: Aeva, Inc., Mountain View, CA (US)

( * ) Notice: Subject to any disclaimer, the term of this patent is extended or adjusted under 35 U.S.C. 154(b) by 982 days.

(21) Appl. No.: 18/075,622

(22) Filed: Dec. 6, 2022

(65) Prior Publication Data

US 2024/0183947 A1 Jun. 6, 2024

(51) Int. Cl.

*G01S 7/481* (2006.01)
*G01S 7/4913* (2020.01)
*G01S 17/34* (2020.01)
*G02B 26/10* (2006.01)

(52) U.S. Cl.

CPC .......... *G01S 7/4817* (2013.01); *G01S 7/4812* (2013.01); *G01S 7/4913* (2013.01); *G01S 17/34* (2020.01); *G02B 26/10* (2013.01); *G02B 26/105* (2013.01); *G01S 7/4813* (2013.01)

(58) Field of Classification Search

None
See application file for complete search history.

(56) References Cited

U.S. PATENT DOCUMENTS

| | | | | | |
|---|---|---|---|---|---|
| 4,139,269 | A * | 2/1979 | Backenkohler | B60R 1/081 359/850 |
| 11,933,894 | B2 * | 3/2024 | Cho | G02B 26/108 |
| 2018/0284237 | A1 * | 10/2018 | Campbell | G01S 17/931 |
| 2019/0154816 | A1 * | 5/2019 | Hughes | G01D 5/34 |
| 2020/0064623 | A1 * | 2/2020 | Ain-Kedem | G03G 15/04036 |
| 2020/0292673 | A1 * | 9/2020 | Galloway | G01S 7/4814 |
| 2023/0366988 | A1 * | 11/2023 | Li | G01S 17/931 |

* cited by examiner

*Primary Examiner* — Isam A Alsomiri
*Assistant Examiner* — Joseph C Fritchman
(74) *Attorney, Agent, or Firm* — Womble Bond Dickinson (US) LLP

(57) ABSTRACT

A light detection and ranging (LIDAR) system that includes an optical processing system to transmit an optical beam and receive a return signal responsive to transmission of the optical beam. The system also includes a 1D scanning mirror to reflect the optical beam from the optical processing system to a plurality of multifaceted mirrors. The system also includes a first multifaceted mirror and a second multifaceted mirror coupled to the first multifaceted mirror in a stacked configuration. The 1D scanning mirror is controllable to direct the optical beam to the first multifaceted mirror to generate a first scan pattern and to the second multifaceted mirror to generate a second scan pattern.

20 Claims, 10 Drawing Sheets

TECHNIQUES FOR PROVIDING A VARIETY OF LIDAR SCAN PATTERNS

FIELD OF INVENTION

The present disclosure is related to light detection and ranging (LIDAR) systems, and more particularly to systems and methods of providing a variety of LIDAR scan patterns.

BACKGROUND

Frequency-Modulated Continuous-Wave (FMCW) LIDAR systems use tunable lasers for frequency-chirped illumination of targets, and coherent receivers for detection of backscattered or reflected light from the targets that are combined with a local copy of the transmitted signal. Mixing the local copy with the return signal, delayed by the round-trip time to the target and back, generates a beat frequency at the receiver that is proportional to the distance to each target in the field of view of the system.

These systems can be used on autonomous vehicles for navigation. In such applications it is generally desired that the mechanical volume of the LIDAR system be as small as possible. Thus, the components inside of a LIDAR system must be reduced to very small sizes. There are many situations in which it is beneficial for a LIDAR system to change its direction of pointing or the scan pattern with which it is observing the surrounding environment. Accommodating various field of view and scan pattern designs within a LIDAR device presents significant integration and volumetric challenges.

BRIEF DESCRIPTION OF THE DRAWINGS

For a more complete understanding of the various examples, reference is now made to the following detailed description taken in connection with the accompanying drawings in which like identifiers correspond to like elements.

DETAILED DESCRIPTION

The present disclosure describes various examples of LIDAR systems and methods for detecting distance and relative speed of objects. To obtain a real-time view of the surrounding environment, the LIDAR system scans the environment with an optical beam generated by a rangefinder and generates a point cloud, wherein each point in the point cloud represents a detected location of an object and the object's speed. The LIDAR system scans the environment along two axes, a vertical axis (also referred to as the elevation axis) and a horizontal axis (also referred to as the azimuthal axis). The horizontal axis is scanned by reflecting the rangefinder's optical beam from a multifaceted mirror that rotates, while the vertical axis is scanned by a one-dimensional (1D) scanning mirror that directs the optical beam to different vertical points on the multifaceted mirror.

In various LIDAR applications, there may be many situations in which it is beneficial for a LIDAR system to have different scan patterns for different areas of the surrounding environment or to change the scan pattern depending on operating conditions. The present techniques provide a LIDAR system with optical components that can facilitate a wide range of scan patterns and pointing directions. Additionally, the various optical components may be designed to fit within a small mechanical volume, when compared to existing LIDARs with comparable performance.

In example embodiments of the present techniques, the LIDAR system includes a plurality of multifaceted mirrors that are stacked vertically. Each multifaceted mirror includes a different number of facets which can be used to produce different scan patterns. To achieve a selected scan pattern, embodiments of the present disclosure can use 1D scanning mirrors to direct optical beams to a corresponding multifaceted mirror. In this way, the LIDAR system can dynamically alter scan patterns based on a current set of system and/or environmental conditions.

In some embodiments, the LIDAR system can also include a plurality of rangefinders, each paired with its own 1D scanning mirror. Each rangefinder and 1D scanning mirror can be configured to operate independently to achieve a different scan pattern. The data from each rangefinder can be combined into the same point cloud. This enables the LIDAR system to increase the scan pattern density or to achieve different scan patterns for different areas of the environment. The embodiments described herein are also capable of being implemented in a compact form factor, which presents an opportunity for better integration and reduced costs.

In the following description, reference may be made herein to quantitative measures, values, relationships or the like. Unless otherwise stated, any one or more if not all of these may be absolute or approximate to account for acceptable variations that may occur, such as those due to engineering tolerances or the like.

Figure 1:
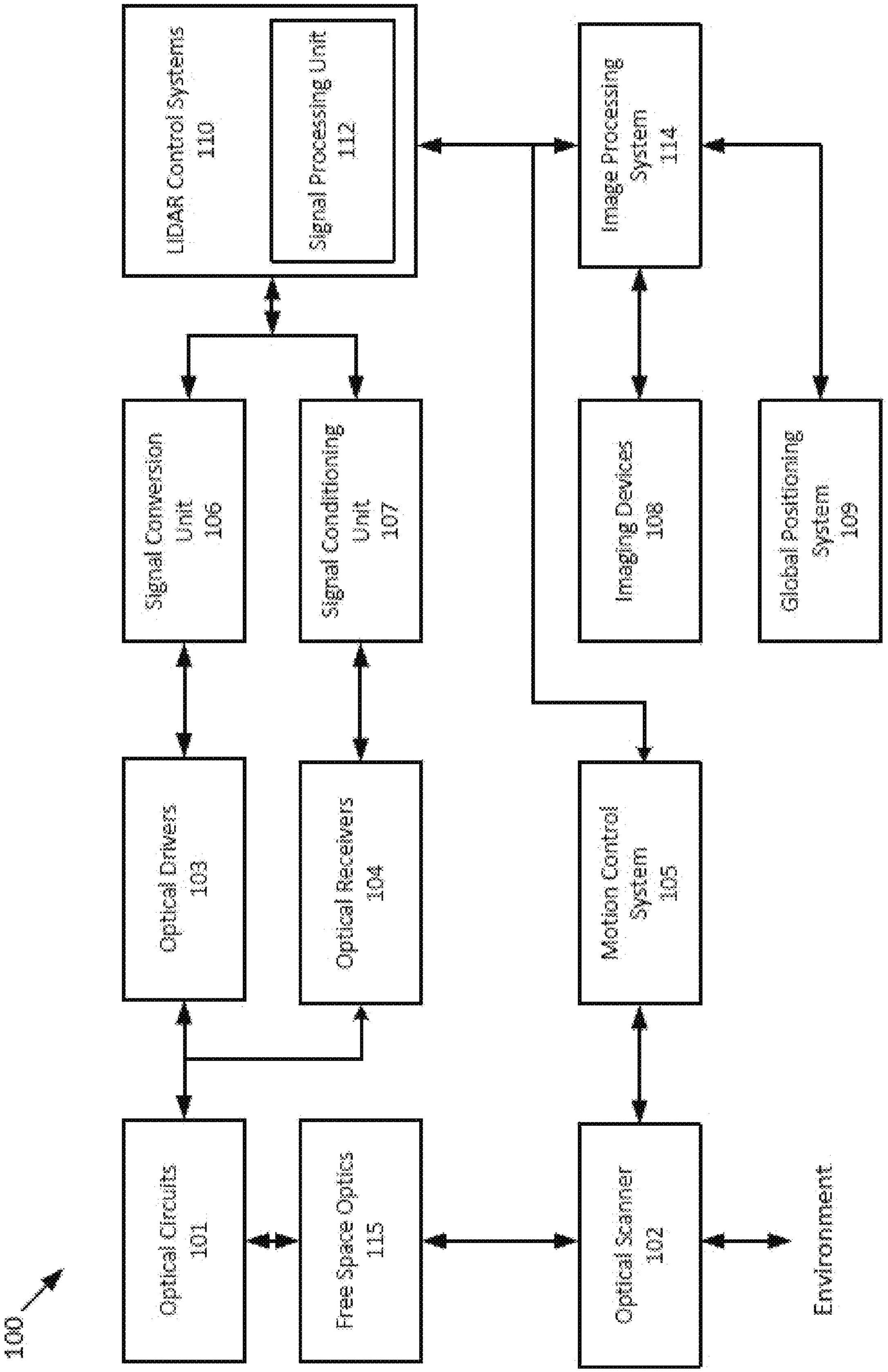
FIG. 1 is a block diagram of an example LIDAR system according to some embodiments of the present disclosure.

FIG. 1 is a block diagram of an example LIDAR system 100 according to example implementations of the present disclosure. The LIDAR system 100 includes one or more of each of a number of components but may include fewer or additional components than shown in FIG. 1. As shown, the LIDAR system 100 includes optical circuits 101 implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scan pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
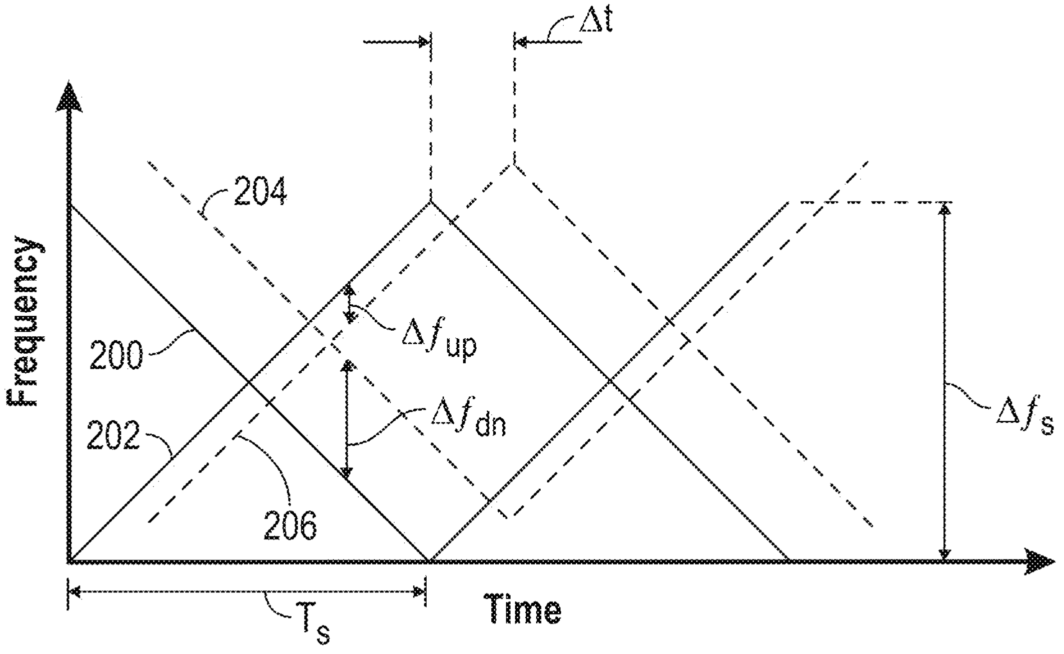
FIG. 2 is a time-frequency diagram of FMCW scanning signals that can be used by a LIDAR system according to some embodiments of the present disclosure.

FIG. 2 is a time-frequency diagram of FMCW scanning signals that can be used by a LIDAR system according to some embodiments. The FMCW scanning signals 200 and 202 may be used in any suitable LIDAR system, including the system 100, to scan a target environment. The FMCW scanning signal 200 may be a triangular waveform with an up-chirp and a down-chirp having a same bandwidth $\Delta f_s$ and period $T_s$. The other FMCW scanning signal 202 is also a triangular waveform that includes an up-chirp and a down-chirp with bandwidth $\Delta f_s$ and period $T_5$. However, the two signals are inverted versions of one another such that the up-chirp on FMCW scanning signal 200 occurs in unison with the down-chirp on FMCW scanning signal 202.

FIG. 2 also depicts example return signals 204 and 206. The return signals 204 and 206, are time-delayed versions of the FMCW scanning signals 200 and 202, where Δt is the round trip time to and from a target illuminated by FMCW scanning signal 201. The round trip time is given as Δt=2R/v, where R is the target range and v is the velocity of the optical beam, which is the speed of light c. The target range, R, can therefore be calculated as R=c(Δt/2).

In embodiments, the time delay Δt is not measured directly, but is inferred based on the frequency differences between the outgoing scanning waveforms and the return signals. When the return signals 204 and 206 are optically mixed with the corresponding scanning signals, a signal referred to as a "beat frequency" is generated, which is caused by the combination of two waveforms of similar but slightly different frequencies. The beat frequency indicates the frequency difference between the outgoing scanning waveform and the return signal, which is linearly related to the time delay Δt by the slope of the triangular waveform.

If the return signal has been reflected from an object in motion, the frequency of the return signal will also be affected by the Doppler effect, which is shown in FIG. 2 as an upward shift of the return signals 204 and 206. Using an up-chirp and a down-chirp enables the generation of two beat frequencies, $\Delta f_{up}$ and $\Delta f_{dn}$. The beat frequencies $\Delta f_{up}$ and $\Delta f_{dn}$ are related to the frequency difference cause by the range, $\Delta f_{Range}$, and the frequency difference cause by the Doppler shift, $\Delta f_{Doppler}$, according to the following formulas:

$$\Delta f_{up}=\Delta f_{Range}-\Delta f_{Doppler} \quad (1)$$

$$\Delta f_{dn}=\Delta f_{Range}+\Delta f_{Doppler} \quad (2)$$

Thus, the beat frequencies $\Delta f_{up}$ and $\Delta f_{dn}$ can be used to differentiate between frequency shifts caused by the range and frequency shifts caused by motion of the measured object. Specifically, $\Delta f_{Doppler}$ is the difference between the $\Delta f_{up}$, and $\Delta f_{dn}$ and the $\Delta f_{Range}$ is the average of $\Delta f_{up}$ and $\Delta f_{dn}$.

The range to the target and velocity of the target can be computed using the following formulas:

$$\text{Range} = \Delta f_{Range}\frac{cT_s}{2\Delta f_s} \quad (3)$$

$$\text{Velocity} = \Delta f_{Doppler}\frac{\lambda_c}{2} \quad (4)$$

In the above formulas, $\lambda_c$=c/$f_c$ and $f_c$ is the center frequency of the scanning signal.

The beat frequencies can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100.

In some scenarios, to ensure that the beat frequencies accurately represent the range and velocity of the object, beat frequencies can be measured at a same moment in time, as shown in FIG. 2. Otherwise, if the up-chirp beat frequency and the down-chirp beat frequencies were measured at different times, quick changes in the velocity of the object could cause inaccurate results because the Doppler effect would not be the same for both beat frequencies, meaning that equations (1) and (2) above would no longer be valid. In order to measure both beat frequencies at the same time, the up-chirp and down-chirp can be synchronized and transmitted simultaneously using two signals that are multiplexed together.

Figure 3:
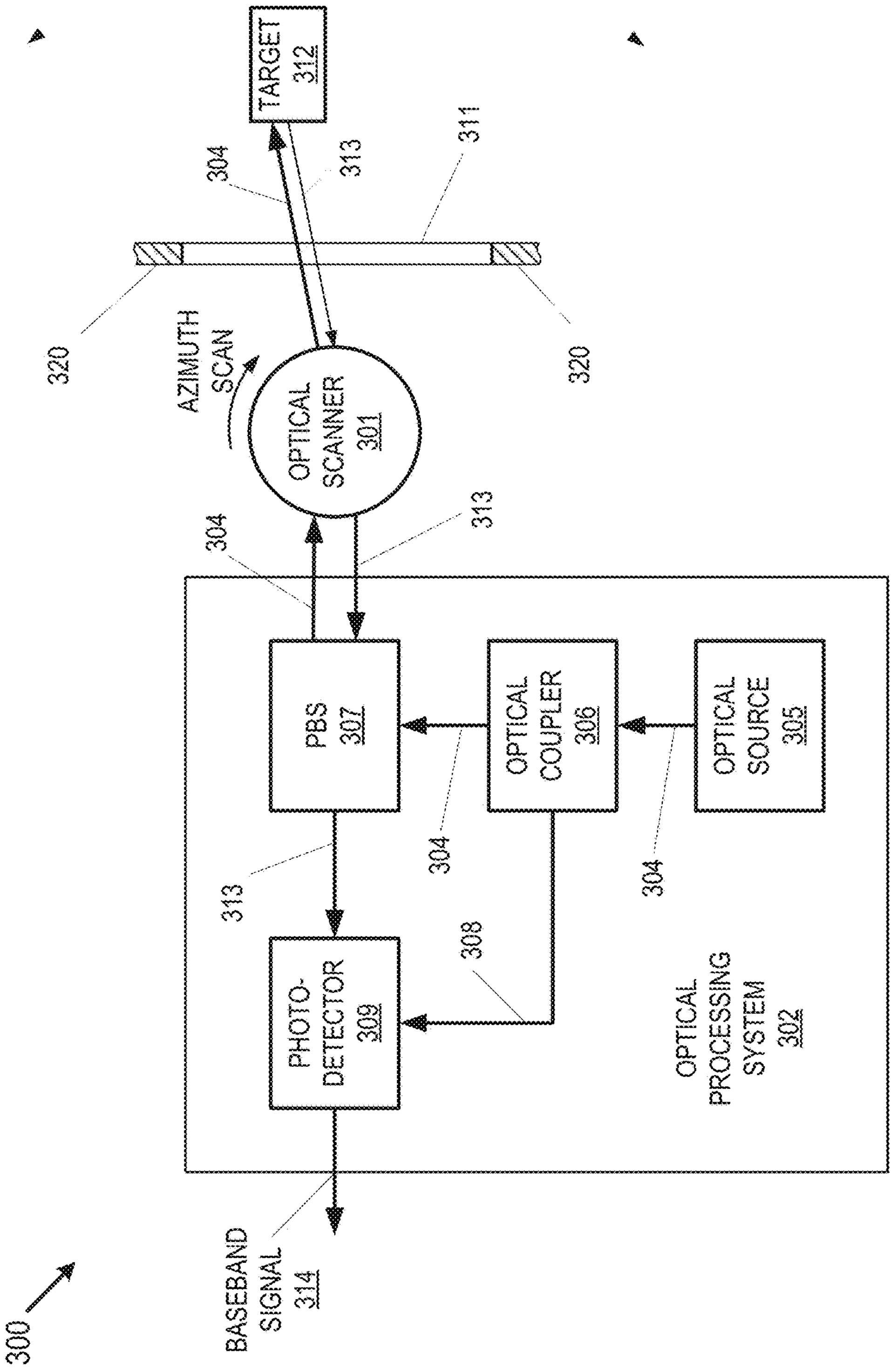
FIG. 3 is a block diagram illustrating an example optical system 300 according to some embodiments of the present disclosure.

FIG. 3 is a block diagram illustrating an example optical system 300 according to some embodiments of the present disclosure. Optical system 300 may include an optical scanner 301, which may be the optical scanner 102 illustrated and described in relation to FIG. 1. Optical system 300 may also include an optical processing system 302, which may include elements of free space optics 115, optical circuits 101, optical drivers 103, optical receivers 104 and signal conversion unit 106, for example. The optical processing system 302 may also be referred to herein as a rangefinder.

Optical processing system 302 may include an optical source 305 to generate a frequency-modulated continuous-wave (FMCW) optical beam 304. The optical beam 304 may be directed to an optical coupler 306, that is configured to couple the optical beam 304 to a polarization beam splitter (PBS) 307, and a sample 308 of the optical beam 304 to a photodetector (PD) 309. The PBS 307 is configured to direct the optical beam 304, because of its polarization, toward the optical scanner 301. Optical scanner 301 is configured to scan a target environment with the optical beam 304, through a range of azimuth and elevation angles covering a specified field of view (FOV). In FIG. 3, for ease of illustration, only the azimuth scan is illustrated. However, it will be appreciated that the optical scanner 301 may be configured to perform the azimuth (horizontal) scan and the elevation (vertical) scan as described further below.

As shown in FIG. 3, at one azimuth angle (or range of angles), the optical beam 304 may pass through the LIDAR window 320 unobstructed and illuminate a target 312.vb A return signal 313 from the target 312 will pass unobstructed through LIDAR window 320 and be directed by optical scanner 301 back to the PBS 307. In the PD 309, the return signal 313 is spatially mixed with the local sample 308 of the optical beam 304 to generate a range-dependent baseband signal 314 in the time domain. The range-dependent baseband signal 314 is the frequency difference between the local sample 308 and the return signal 313 versus time (i.e., $\Delta f_R(t)$). The baseband signal 314 can then be processed as described above to determine the speed and distance of the target 312. The distance information can be used in concert with information about the orientation of the optical scanner to determine a particular location in space. This speed and location make up a single data point that can be added to the point cloud.

As described further below, the optical scanner 301 can include one or more multifaceted mirrors, and each multifaceted mirror may be shaped to provide a different field of view and frame rate. Additionally, although one optical processing system 302 is shown in FIG. 3, the optical system 300 can include two or more optical processing systems 302 optically coupled with the optical scanner 301. Example embodiments of optical systems are described further in relation to FIGS. 4-7.

Figure 4:
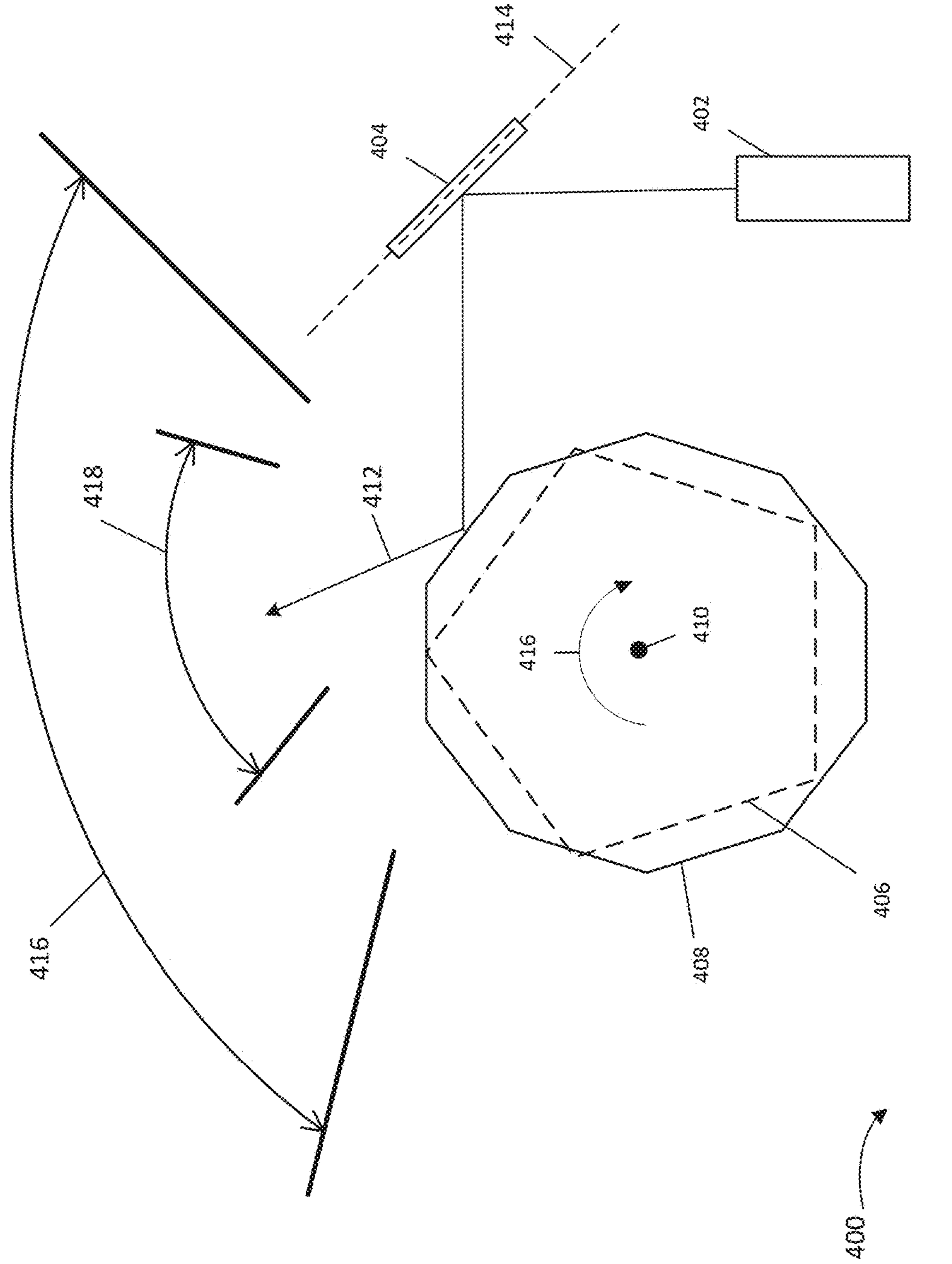
FIG. 4 is a top view of an optical scanning system according to some embodiments of the present disclosure.

FIG. 4 is a top view of an optical scanning system according to some embodiments of the present disclosure. The optical scanning system 400 includes an optical processing system 402 (e.g, rangefinder), a 1D scanning mirror 404 (e.g., galvo mirror), a multifaceted mirror 406 and a multifaceted mirror 408. In some embodiments, some or all of the multifaceted mirror 406 facets (e.g., the sides of a polygon scanner) are reflective. The optical processing system 402 emits an optical beam 412, which is reflected by the 1D scanning mirror 404 to one of the multifaceted mirrors 406 or 408 and then reflected by the multifaceted mirror 406 or 408 to an external environment. Although not shown, it will be appreciated that the return beam will travel in reverse along the same path. Additionally, the system 400 can also include additional mirrors (adjustable or stationary) for directing the optical beam from the optical processing system 402 to the multifaceted mirrors.

The multifaceted mirrors 406 and 408 are configured to perform an azimuthal scan by rotating about a central axis 410 under the control of a motor as shown by the arrow 416. It should be noted that the optical beam 412 shown in FIG. 4 is shown at a single instant in time and a particular point in the rotation. However, it can be appreciated that as the multifaceted mirror 408 rotates, the angle of the impacted facet changes and causes the optical beam to sweep across the azimuthal field of view (FOV). Once the rotation of the multifaceted mirror 408 causes the optical beam to impact the next facet, a next sweep of the azimuthal FOV is performed. The multifaceted mirrors 406 and 408 may rotate clockwise or counterclockwise.

The angle of the 1D scanning mirror 404 is adjustable around a single tilt axis 414. To perform the elevation scan, the 1D scanning mirror 404 tilts up or down to direct the optical beam to a different vertical point on the facet of mirror 406 or 408.

As shown in FIG. 4, the multifaceted mirrors 406 and 408 are in the shape of a regular polygon with uniformly sized facets. However, other shapes are possible and the facets for a single multifaceted mirror may be different sizes. In the depicted embodiment, the multifaceted mirror 406 is a polygon with five equal sized facets, and the multifaceted mirror 408 is a polygon with ten equal sized facets. The multifaceted mirrors 406 and 408 are stacked vertically with the multifaceted mirror 406 positioned below the multifaceted mirror 408.

In some embodiments, the multifaceted mirrors 406 and 408 are fixed to one another (or formed as a single body) and rotate together with the same rotational velocity. In other embodiments, the multifaceted mirrors may be able to rotate independently, at different rotational velocities, under the control of separate motors (not depicted), for example.

Due to the different shapes of the multifaceted mirrors 406 and 408, each one provides a different scan pattern. The features of the scan pattern that can be changed include the frame rate, the azimuthal field of view, the elevation field of view, and others. The frame rate for each multifaceted mirror may be a function of the number of facets and the rotational speed of the multifaceted mirror. In the embodiment shown in FIG. 4, the multifaceted mirror 406 has half the number of facets as the multifaceted mirror 408 and will therefore provide a frame rate that is half the frame rate provided by the multifaceted mirror 408 when the two multifaceted mirror are rotating together at the same speed.

In embodiments in which the two multifaceted mirrors can rotate independently, the frame rates can be controlled by rotating each multifaceted mirror at different rotational velocities. In such embodiments, each multifaceted mirror may have the same number and shape of facets and the different scan patterns can be achieved using different rotational velocities for each multifaceted mirror.

The azimuthal field of view for each polygon is at least partly a function of the width of each facet (e.g. the length of the sides of the polygon). Wider facets provide a wider azimuthal field of view. Accordingly, the azimuthal field of view 416 provided by the multifaceted mirror 406 will be wider than the azimuthal field of view 418 provided by the multifaceted mirror 408.

The elevation field of view for each polygon is at least partly a function of the vertical height of each facet and the positions of the multifaceted mirrors relative to the 1D scanning mirror. The multifaceted mirror 408 being slightly higher will tend to reflect the optical beam higher compared to the multifaceted mirror 406. Taller facets will increase the potential field of view that can be achieved in the vertical direction. Additionally, the elevation field of view can also be controlled by the 1D scanning mirror scanning less than the full height of the facets.

The 1D scanning mirror 404 can direct the optical beam 412 to either of the multifaceted mirrors 406 or 408 depending on the desired scan pattern to be generated. The scanning mirror can target the multifaceted mirror 406 to achieve a first scan pattern or multifaceted mirror 408 to achieve a second scan pattern. In some embodiments, the 1D scanning mirror can target both multifaceted mirrors 406 and 408 at different times during a single sweep of the azimuth scan to achieve a combined scan pattern.

It will be appreciated that a variety of alterations may be made to the depicted system without deviating from the scope of the claims. For example, various embodiments may include additional multifaceted mirrors stacked above or below the depicted multifaceted mirrors 406 and 408. Additionally, the shapes of the multifaceted mirrors may be any suitable shape and can be tailored to provide a variety of scan patterns depending on the details of a particular implementation.

Figure 5:
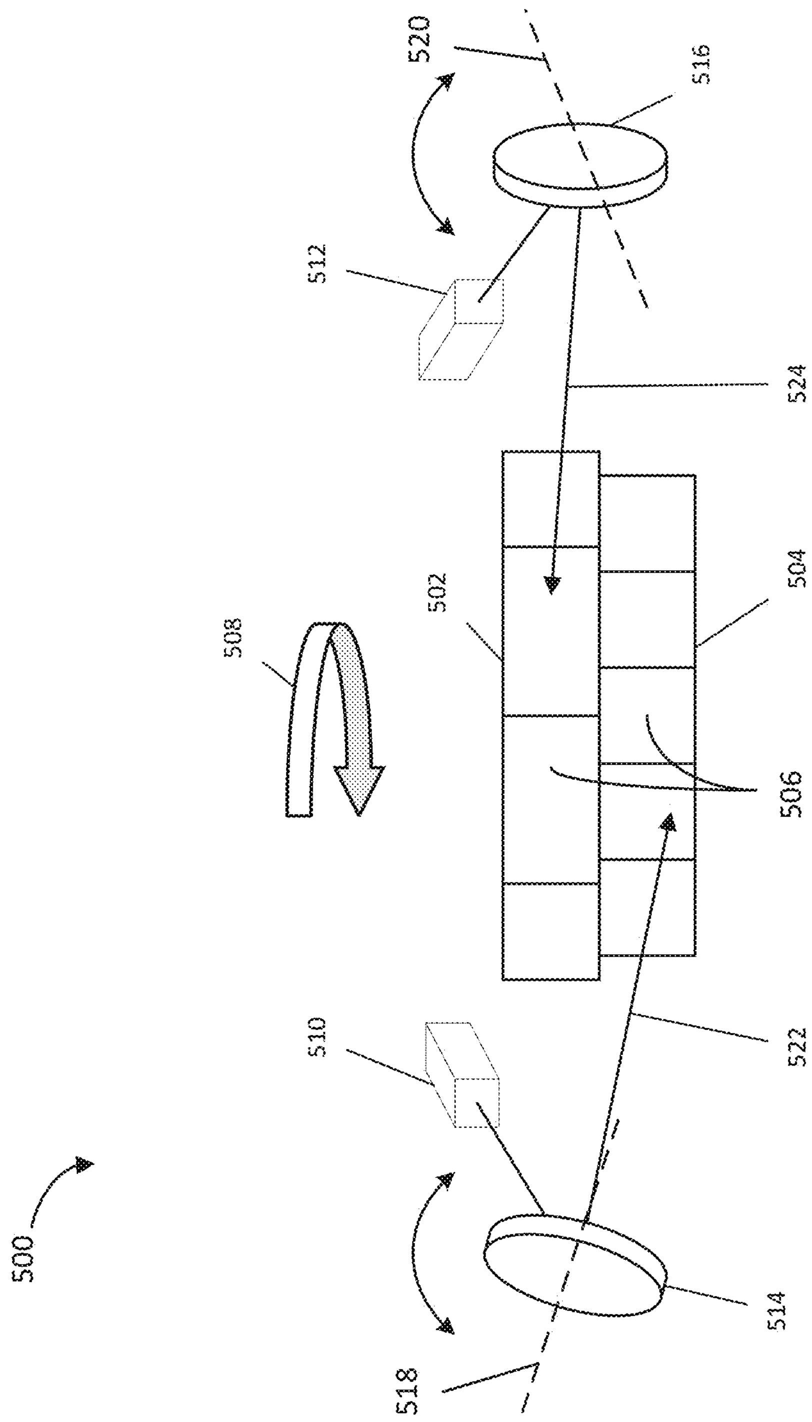
FIG. 5 is a front view of an optical scanning system according to some embodiments of the present disclosure.

FIG. 5 is a front view of an optical scanning system according to some embodiments of the present disclosure. The front view, or elevation view, is from the perspective of the outside environment being scanned. The optical scanning system 500 according to the embodiment of FIG. 5 includes a multifaceted mirror 502 and a multifaceted mirror 504. The multifaceted mirrors 502 and 504 may be polygons like the polygon shapes shown in FIG. 4. In FIG. 5, the multifaceted mirrors are shown from the front such that the reflective surface of the forward-facing facets 506 are facing toward the viewer. As in FIG. 4, the multifaceted mirrors 502 and 504 are stacked upon one another and configured to perform an azimuthal scan by rotating about a central axis as shown by the arrow 508.

The optical scanning system 500 includes two optical processing systems 510 and 512 (e.g., rangefinders), each paired with its own 1D scanning mirror 514 and 516 (e.g., galvo mirrors). To perform elevation scans, the angle of the 1D scanning mirror 514 is adjustable around a tilt axis 518, and the angle of the 1D scanning mirror 516 is adjustable around a tilt axis 520. The optical processing system 510 emits an optical beam 522, which is reflected by the 1D scanning mirror 514 to the multifaceted mirror 504, which reflects the optical beam 522 to the external environment. Similarly, the optical processing system 512 emits an optical beam 524, which is reflected by the 1D scanning mirror 516 to the multifaceted mirrors 502, which reflects the optical beam 524 to the external environment.

The 1D scanning mirror 514 and the 1D scanning mirror 516 are controllable to generate a combined scan pattern that includes the first scan pattern combined with the second scan pattern. In this way, the optical scanning system 500 can acquire twice as many data points in the same amount of time compared to an optical scanning system with only one optical processing system. Examples of combined scan patterns are shown in FIGS. 8A-8D.

Additionally, the 1D scanning mirrors 514 and 516 can be independently controllable and can direct one or more optical beams to either of the multifaceted mirrors 502 and/or 504. Accordingly, various combinations of scanning strategies can be accomplished. For example, as shown in FIG. 5, the 1D scanning mirror 514 may direct optical beams to the multifaceted mirror 504, while the 1D scanning mirror 516 directs optical beams to the multifaceted mirror 502. Alternatively, one or both 1D scanning mirrors 514 and/or 516 may direct optical beams to both multifaceted mirrors 502 and 504. Additionally, both 1D scanning mirrors 514 and 516 can direct optical beams to a single multifaceted mirror 502 or 504. The particular scanning strategy used may depend on the desired scanning density, the frame rate, and the desired field of view or combination of different fields of view.

Compared to the multifaceted mirror 504, the multifaceted mirror 502 includes a fewer number of facets and therefore generates a scan pattern with a wider azimuthal field of view and slower frame rate. Additionally, the vertical field of view may tend to be higher for the multifaceted mirror 502 since it sits above the multifaceted mirror 506. Additionally, due to the different positions and orientations of the two 1D scanning mirrors 514 and 516, the azimuthal field of view achievable by the 1D scanning mirror 514 may be shifted horizontally compared to the azimuthal field of view achievable by the 1D scanning mirror 516.

The combination of scanning strategies used at any moment is programmable and can be controlled in real time based on a variety of factors such as the current operating conditions or objects detected. For example, a default scanning strategy may involve both 1D scanning mirrors 514 and 516 targeting both multifaceted mirrors 502 and 504. In response to the detection of an external event, the scanning strategy may be adjusted to a new scanning strategy. For example, if an object is detected in the field of view covered by the multifaceted mirror 504, one of the 1D scanning mirrors 514 or 516 may switch from scanning both multifaceted mirrors to only the multifaceted mirror 504 to try to increase the density of the point cloud in a specified direction.

It will be appreciated that a variety of alterations may be made to the depicted system without deviating from the scope of the claims. For example, various embodiments may include additional multifaceted mirrors stacked above or below the depicted multifaceted mirrors 502 and 504. Some embodiments may even include a single multifaceted mirror. Additionally, the shapes of the multifaceted mirrors may be any suitable shape and can be tailored to provide a variety of scan patterns depending on the details of a particular implementation.

Figure 6:
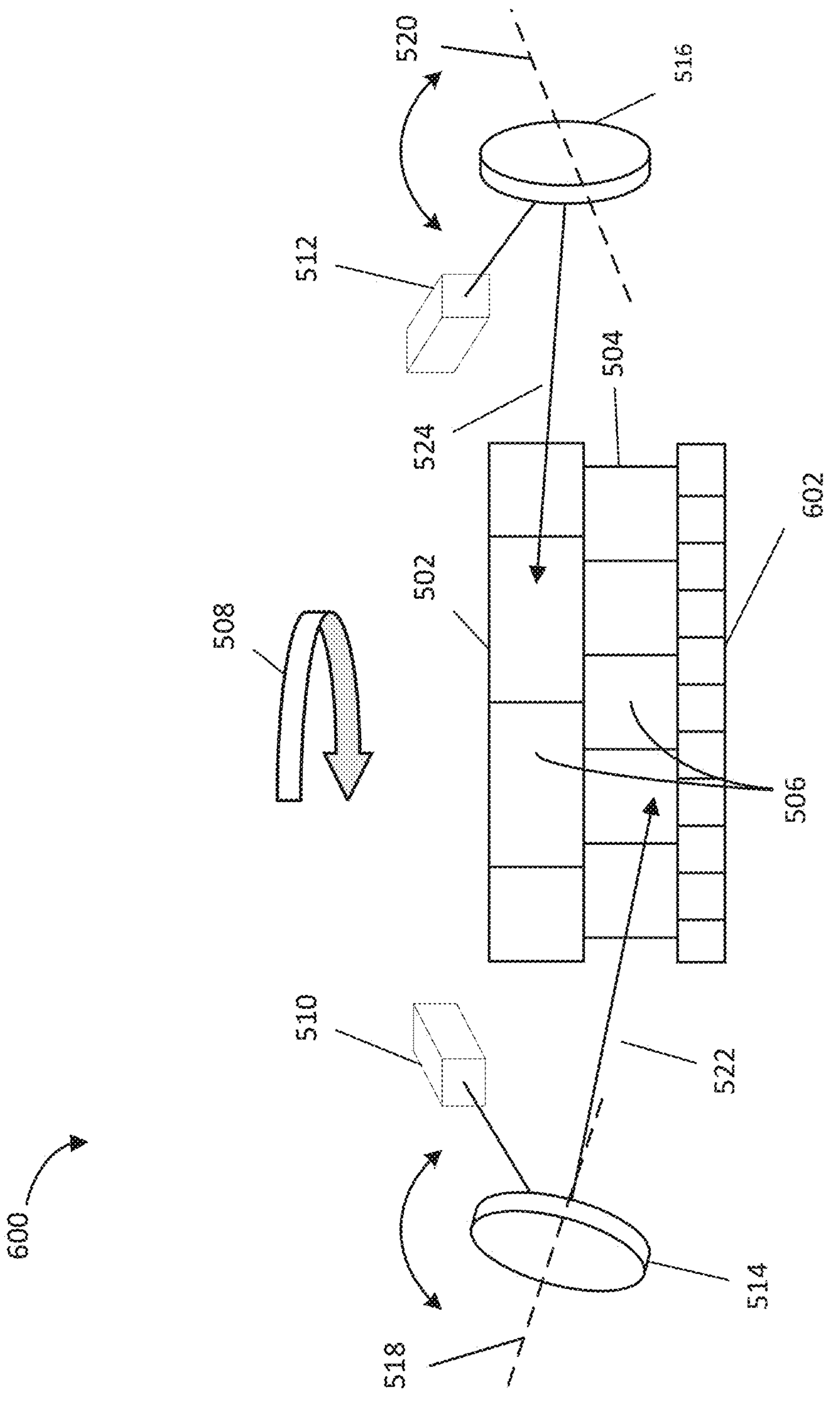
FIG. 6 is a front view of another optical scanning system according to some embodiments of the present disclosure.

FIG. 6 is a front view of another optical scanning system according to some embodiments of the present disclosure. As in FIG. 5, the optical scanning system 600 includes two optical processing systems 510 and 512 (e.g., rangefinders), each paired with its own 1D scanning mirror 514 and 516 (e.g., galvo mirrors). However, in addition to the multifaceted mirrors 502 and 504, the optical scanning system 600 also includes a multifaceted mirror 602. Operation of the optical scanning system 600 is substantially the same as the optical scanning system 500 described in relation to FIG. 5, except that the 1D scanning mirrors 514 and 516 can additionally target the multifaceted mirror 602. The multifaceted mirror 602 has a much larger number of facets to provide a faster sampling rate with a narrower field of view.

Figure 7:
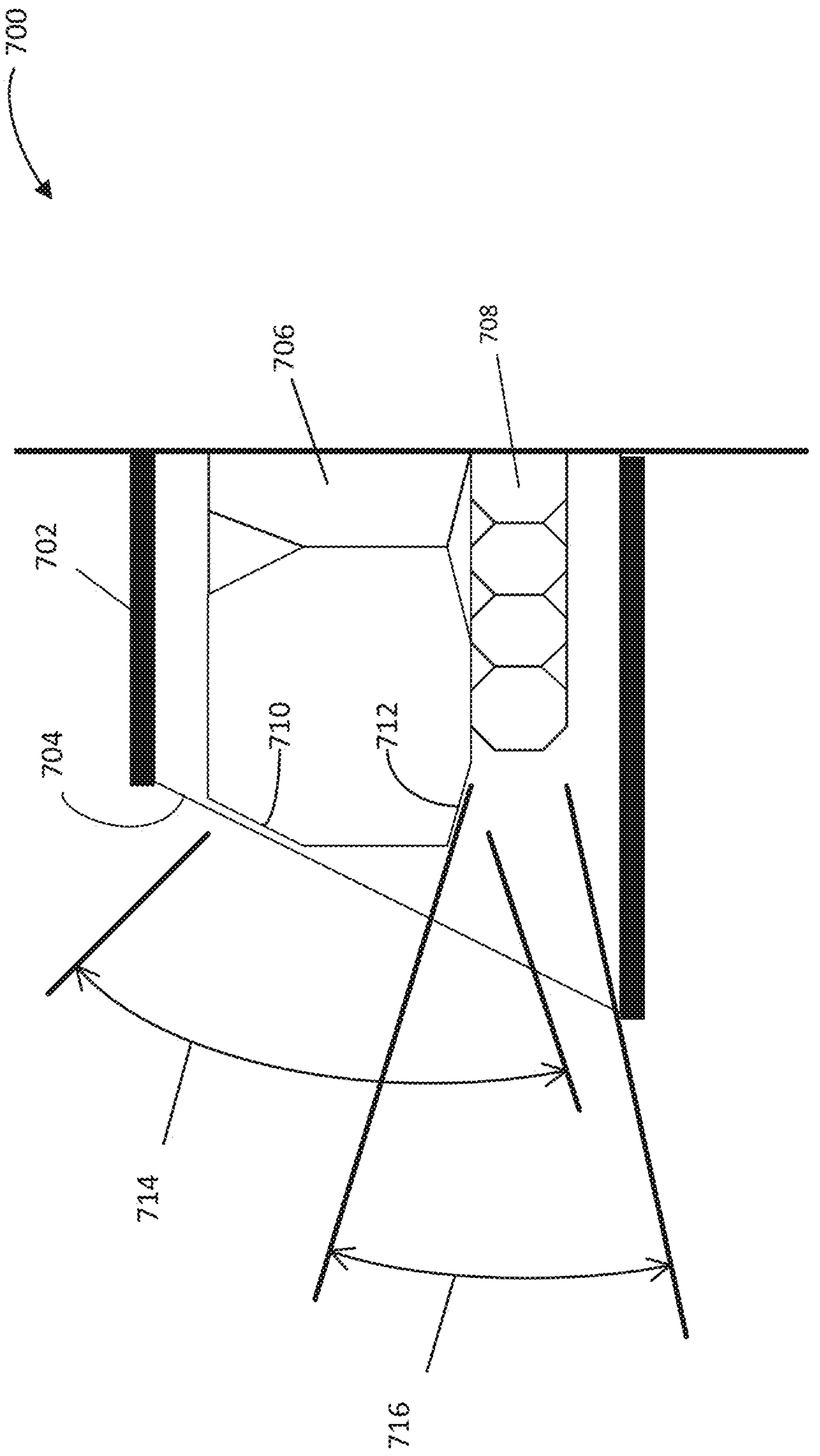
FIG. 7 is a side view optical scanning system according to some embodiments of the present disclosure.

FIG. 7 is a side view of an optical scanning system according to some embodiments of the present disclosure. The optical scanning system 700 includes an enclosure 702 for housing the components of the optical scanning system 700. The enclosure 702 includes a transparent window 704. In FIG. 7, the side of the enclosure 702 is also shown as transparent. However, the sides of the enclosure 702 may be opaque. Inside the enclosure are a pair of stacked multifaceted mirrors, referred to herein as top mirror 706 and bottom mirror 708. The top mirror 706 provides an elevation field of view 714 and bottom mirror 708 provides an elevation field of view 716. Additional components of the optical scanning system 700 that are not shown in FIG. 7 may include one or more rangefinders, 1D scanning mirrors, mounting devices, motors, etc.

As shown in FIG. 7, the top mirror 706 and the bottom mirror 708 may include one or more edges that are curved, sloped, angled, etc. to certain degrees at the top and/or bottom edges (e.g., chamfers, fillets, and the like). For instance, as depicted in FIG. 7, the chamfered edge may serve different purposes depending on the location. For example, the top mirror 706 may include a chamfer 710 located at the top edge closest to the window 704. The chamfer 710 is parallel to the window 704 and enables the system to be more mechanically compact because the stacked mirrors can be moved closer to the window. The top mirror 706 may also include a chamfer 712 located at the bottom edge. The chamfer 712 prevents the top mirror 706 from obstructing the field of view provided by the bottom mirror 708. Similarly, chamfers on bottom mirror 708 prevent it from obstructing the field of view provided by the top mirror 706.

FIGS. 8A-8D show examples of various scan patterns that may be obtained in accordance with some embodiments of the present disclosure. The scan patterns may be obtained using any of the optical scanning systems described herein, including optical scanning systems shown in FIGS. 5 and 6.

Figure 8A:
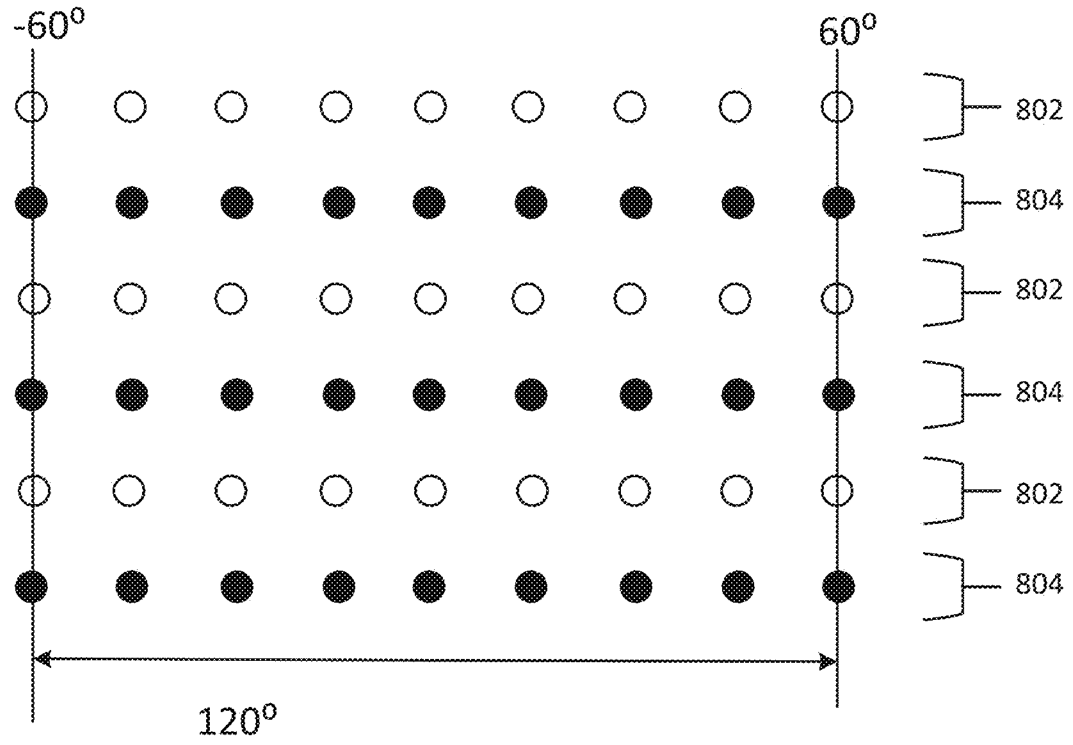
FIGS. 8A, 8B, 8C, and 8D show examples of various scan patterns that may be obtained in accordance with some embodiments of the present disclosure.

FIG. 8A, with slight reference to elements depicted in FIGS. 5 and 6, shows an example of an interleaved scan pattern produced by embodiments of the present disclosure. For instance, in FIGS. 8A-8D, data points 802 are gathered using rangefinder/1D scanning mirror pair 512/516, and data points 804 are gathered using rangefinder/1D scanning mirror pair 510/514. In FIG. 8A, both rangefinder/1D scanning mirror pairs 512/516 and 510/514 are covering the same or similar area of the environment. For example, both rangefinder/1D scanning mirror pairs 512/516 and 510/514 have an azimuthal field of view from −60 degrees to +60 degrees. Interleaving the scan patterns as shown in FIG. 8A enables the system to increase the scan density within the covered field of view.

Figure 8B:
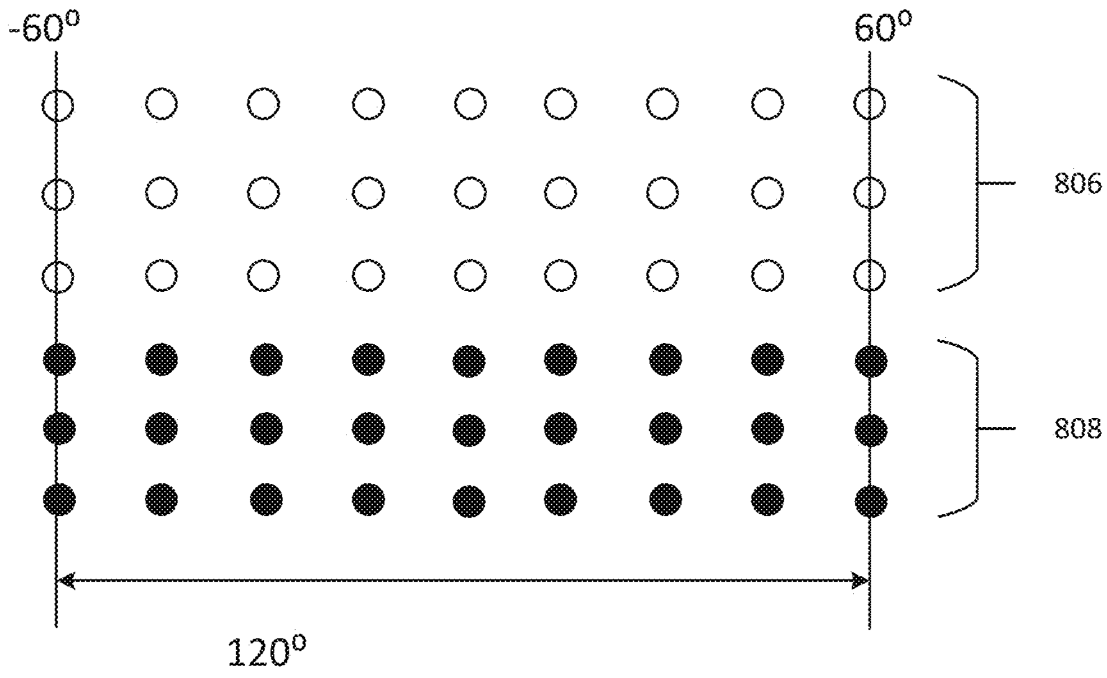

FIG. 8B, with slight reference to elements depicted in FIGS. 5 and 6, shows an example of a non-interleaved scan pattern produced by embodiments of the present disclosure. In the example of FIG. 8B, the two rangefinder/1D scanning mirror pairs 512/516 and 510/514 are covering different areas of the environment. Specifically, the rangefinder/1D scanning mirror pair 512/516, which produces data points 806, are covering areas that are higher compared to rangefinder/1D scanning mirror pair 510/514, which produces data points 808. It should be appreciated that, although two fields of view are shown as adjacent to one another, the field of view covered by each rangefinder/1D scanning mirror pair may have a greater degree of separation vertically and may also cover different ranges of azimuthal angles from one another.

Figure 8C:
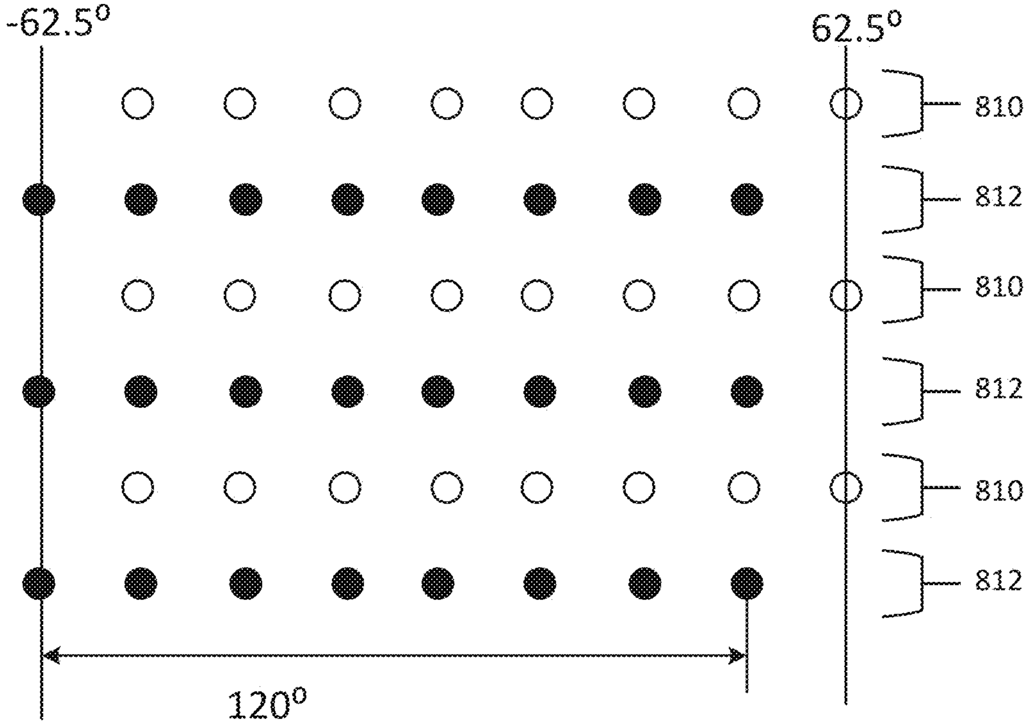

FIG. 8C, with slight reference to elements depicted in FIGS. 5 and 6, shows another example of an interleaved scan pattern produced by embodiments of the present disclosure. In FIG. 8C, both rangefinder/1D scanning mirror pairs 512/516 and 510/514 are covering the same or similar elevation fields of view but are offset in the azimuthal field of view. Specifically, both rangefinder/1D scanning mirror pairs 512/516 and 510/514 have a 120 degree azimuthal field of view. However, the coverage provided by the rangefinder/1D scanning mirror pair 512/516 ranges from −62.5 degrees to 57.5 degrees to produce data points 812 and the coverage provided by the rangefinder/1D scanning mirror pair 510/514 ranges from −57.5 degrees to 62.5 degrees to produce data points 810. The offset scan patterns shown in FIG. 8C enables the system to increase the overall azimuthal field of view while maintaining a high scan density for the overlapping portions of the two fields of view and lower scan density at the periphery.

Figure 8D:
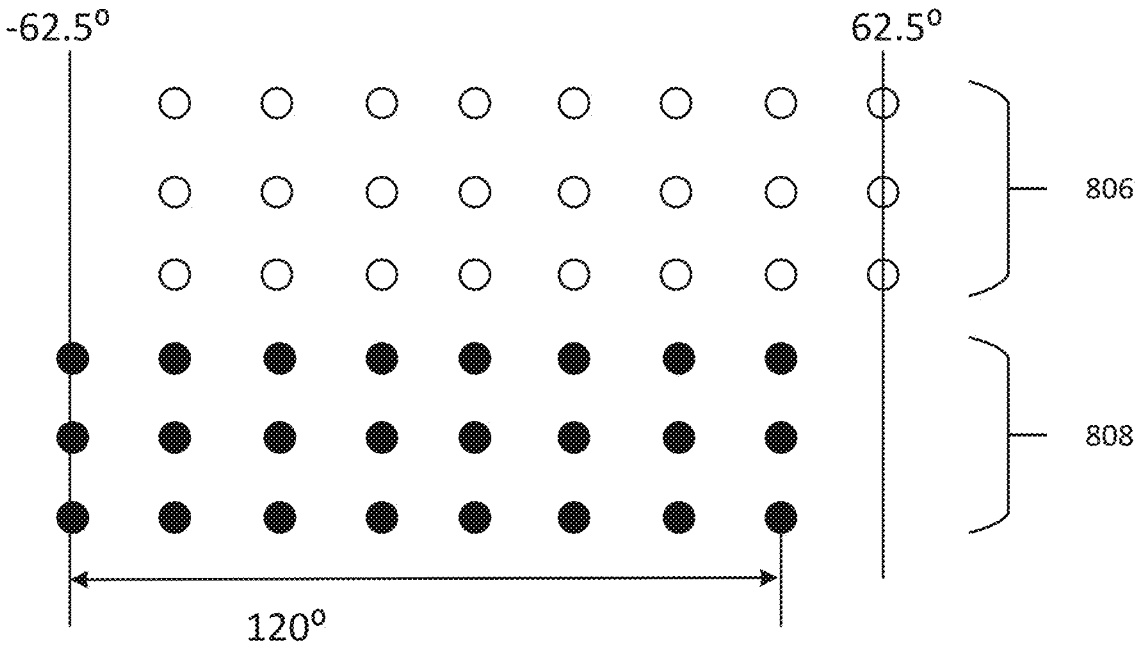

FIG. 8D, with slight reference to elements depicted in FIGS. 5 and 6, shows another example of a non-interleaved scan pattern produced by embodiments of the present disclosure. In the example of FIG. 8D, the two rangefinder/1D scanning mirror pairs 512/516 and 510/514 are covering different areas of the environment that are separated vertically and horizontally. Specifically, the rangefinder/1D scanning mirror pair 512/516 is covering areas that are higher compared to the rangefinder/1D scanning mirror pair 510/514, and the azimuthal field of view the rangefinder/1D scanning mirror pair 512/516 ranges from −57.5 degrees to 62.5 degrees to produce data points 806 while the azimuthal field of view of the rangefinder/1D scanning mirror pair 510/514 ranges from −62.5 degrees to 57.5 degrees to produce data points 808.

It will be appreciated that the scan patterns shown in FIGS. 8A-8D are just a small sample of the variety of scan patterns that can be obtained using the techniques described herein. For example, the azimuthal scan density shown in FIG. 8A-8D is shown as being the same for both rangefinder/1D scanning mirror pairs 512/516 and 510/514. However, it will be appreciated that the azimuthal scan densities and field of view may vary between the two rangefinder/1D scanning mirror pairs 512/516 and 510/514. For example, in the system shown in FIGS. 5 and 6, the azimuthal scan densities and field of view may vary depending on which one of a plurality of the multifaceted mirrors are being targeted.

Figure 9:
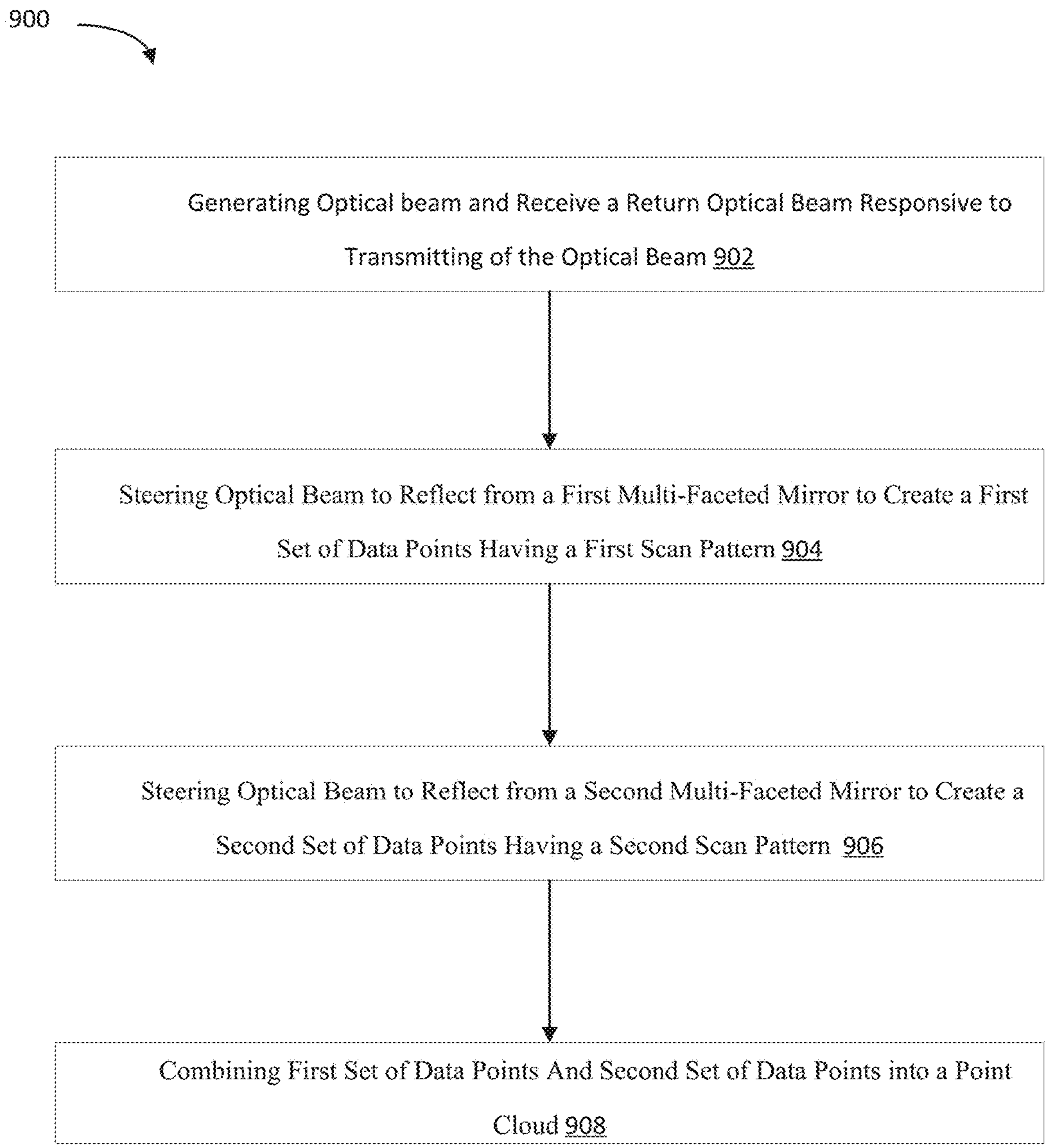
FIG. 9 is a process flow diagram of an example method for measuring range and velocity of an object according to some embodiments of the present disclosure.

FIG. 9 is a process flow diagram of an example method for measuring range and velocity of an object, according to an embodiment of the present disclosure. The method 900 may be performed by any suitable LIDAR system, including the LIDAR systems described above in relation to FIG. 1. The method may begin at block 902.

At block 902, an optical processing system transmits an optical beam and receives a returned optical beam responsive to transmission of the optical beam. The return optical beam can be processed to generate one or more beat frequencies. A range and velocity of an object can be determined from the beat frequencies as described above in relation to FIG. 2. The range and velocity may be computed by a processor, such as the signal processing unit 112 shown in FIG. 1.

At block 904, the optical beam is steered to reflect from a first multifaceted mirror to create a first set of data points having a first scan pattern.

At block 906, the optical beam is steered to reflect from a second multifaceted mirror to create a second set of data points having a second scan pattern. The second scan pattern may be different from the first scan pattern in several ways. For example, the first scan pattern may cover a first field of view (FOV) at a first frame rate, while the second scan pattern covers a second FOV at a second frame rate.

At block 908, the first set of data points and the second set of data points are combined into a point cloud. The point cloud can be processed to identify objects within the environment.

It will be appreciated that embodiments of the method 900 may include additional blocks not shown in FIG. 9 and that some of the blocks shown in FIG. 9 may be omitted. In some embodiments, the optical beam can be steered to reflect from a third multifaceted mirror to create a third set of data points having a third scan pattern. Additionally, to create additional scan patterns, the LIDAR system may include a second optical processing system to generate a second optical beam that can be steered to reflect from one or more multifaceted mirrors. Additionally, the processes associated with blocks 902 through 908 may be performed in a different order than what is shown in FIG. 9.

The preceding description sets forth numerous specific details such as examples of specific systems, components, methods, and so forth, to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operations may be performed, at least in part, concurrently with other operations. Instructions or sub-operations of distinct operations may be performed in an intermittent or alternating manner.

The above description of illustrated implementations of the present disclosure, including what is described in the Abstract, is not intended to be exhaustive or to limit the present disclosure to the precise forms disclosed. While specific implementations of, and examples for, the present disclosure are described herein for illustrative purposes, various equivalent modifications are possible within the scope of the present disclosure, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A frequency modulated continuous wave (FMCW) light detection and ranging (LIDAR) system, comprising:

an optical processing system to transmit an optical beam and receive a return signal responsive to transmission of the optical beam;

a first 1D scanning mirror to reflect the optical beam from the optical processing system to a plurality of multifaceted mirrors;

a first multifaceted mirror of the plurality of multifaceted mirrors; and a second multifaceted mirror of the plurality of multifaceted mirrors coupled to the first multifaceted mirror in a stacked configuration, wherein the first 1D scanning mirror is configured to be controllably movable about a tilt axis to selectively direct the optical beam to the first multifaceted mirror to generate a first scan pattern and to the second multifaceted mirror to generate a second scan pattern.

2. The FMCW LIDAR system of claim 1, wherein the first multifaceted mirror and the second multifaceted mirror rotate together with a same rotational velocity.

3. The FMCW LIDAR system of claim 1, wherein:

the first multifaceted mirror includes a first number of facets and generates the first scan pattern at a first frame rate; and the second multifaceted mirror includes a second number of facets larger than the first number of facets and generates the second scan pattern at a second frame rate higher than the first frame rate.

4. The FMCW LIDAR system of claim 1, wherein the first scan pattern is over a first azimuthal field of view, and the second scan pattern is over a second azimuthal field of view smaller than the first azimuthal field of view.

5. The FMCW LIDAR system of claim 1, comprising:

a second optical processing system to transmit a second optical beam and receive a second return signal responsive to transmission of the second optical beam; and a second 1D scanning mirror to reflect the second optical beam from the second optical processing system to the plurality of multifaceted mirrors, wherein the second 1D scanning mirror is controllable to direct the second optical beam to the first multifaceted mirror to generate a third scan pattern or to the second multifaceted mirror to generate a fourth scan pattern.

6. The FMCW LIDAR system of claim 5, wherein the first 1D scanning mirror and the second 1D scanning mirror are controllable to generate a combined scan pattern that includes the first scan pattern interleaved with the fourth scan pattern.

7. The FMCW LIDAR system of claim 1, comprising a third multifaceted mirror coupled to the first multifaceted mirror and the second multifaceted mirror in a stacked configuration.

8. The FMCW LIDAR system of claim 1, wherein corners of the first multifaceted mirror are chamfered to prevent an edge of the first multifaceted mirror from blocking the optical beam when directed to the second multifaceted mirror.

9. The FMCW LIDAR system of claim 1, comprising a housing to contain the optical processing system, the first 1D scanning mirror, the first multifaceted mirror, and the second multifaceted mirror, wherein the housing comprises a transparent window, and wherein corners of the first multifaceted mirror are chamfered to be parallel to a surface of the transparent window.

10. The FMCW LIDAR system of claim 1, wherein the optical beam is a frequency-modulated continuous wave (FMCW) optical beam.

11. A method of operating a frequency modulated continuous wave (FMCW) light detection and ranging (LIDAR) system, comprising:

transmitting, by an optical processing system, an optical beam and receiving a return signal responsive to transmitting the optical beam;

steering, by moving a 1D scanning mirror about a tilt axis, the optical beam to reflect from a first multifaceted mirror to create a first set of data points having a first scan pattern;

steering, by moving the 1D scanning mirror about the tilt axis, the optical beam to reflect from a second multifaceted mirror to create a second set of data points having a second scan pattern; and combining the first set of data points and the second set of data points into a point cloud.

12. The method of claim 11, wherein the first scan pattern covers a first portion of a field of view (FOV) of the FMCW LIDAR system at a first frame rate; and the second scan pattern covers a second portion of a FOV of the FMCW LIDAR system at a second frame rate.

13. The method of claim 11, comprising rotating the first multifaceted mirror and the second multifaceted mirror together with a same rotational velocity.

14. The method of claim 11, comprising:

transmitting, by a second optical processing system, a second optical beam and receiving a second return signal responsive to transmitting the second optical beam; and steering the second optical beam to reflect from the first multifaceted mirror to create a third set of data points having a third scan pattern; and steering the second optical beam to reflect from the second multifaceted mirror to create a fourth set of data points having a fourth scan pattern.

15. The method of claim 14, comprising steering the optical beam to reflect from a third multifaceted mirror to create a third set of data points having a third scan pattern.

16. A frequency modulated continuous wave (FMCW) light detection and ranging (LIDAR) system, comprising:

a first optical processing system to transmit a first optical beam and receive a first return signal responsive to transmission of the first optical beam;

a first 1D scanning mirror controllably movable about a tilt axis to control a first elevation angle of the first optical beam and to reflect the first optical beam from the first optical processing system to a first multifaceted mirror;

a second optical processing system to transmit a second optical beam and receive a second return signal responsive to transmission of the second optical beam; and a second 1D scanning mirror controllably movable about a tilt axis to control a second elevation angle of the second optical beam and to selectively reflect the second optical beam from the second optical processing system to the first multifaceted mirror and to a second multifaceted mirror, wherein the first multifaceted mirror is rotatable to reflect the first optical beam and the second optical beam into a field of view (FOV) of the FMCW LIDAR system, and wherein the first and second 1D scanning mirrors are to differentially control the first and second elevation angles.

17. The FMCW LIDAR system of claim 16, wherein the first optical beam scans along an elevation axis according to a first scan pattern and the second optical beam scans along the elevation axis according to a second scan pattern.

18. The FMCW LIDAR system of claim 16, wherein the second multifaceted mirror is to reflect the second optical beam into the FOV of the FMCW LIDAR system.

19. The FMCW LIDAR system of claim 18, wherein the first multifaceted mirror and the second multifaceted mirror rotate together with a same rotational velocity.

20. The FMCW LIDAR system of claim 18, wherein:

the first multifaceted mirror includes a first number of facets and generates a first scan pattern at a first frame rate; and the second multifaceted mirror includes a second number of facets larger than the first number of facets and generates a second scan pattern at a second frame rate higher than the first frame rate.

* * * * *